Figure 1:
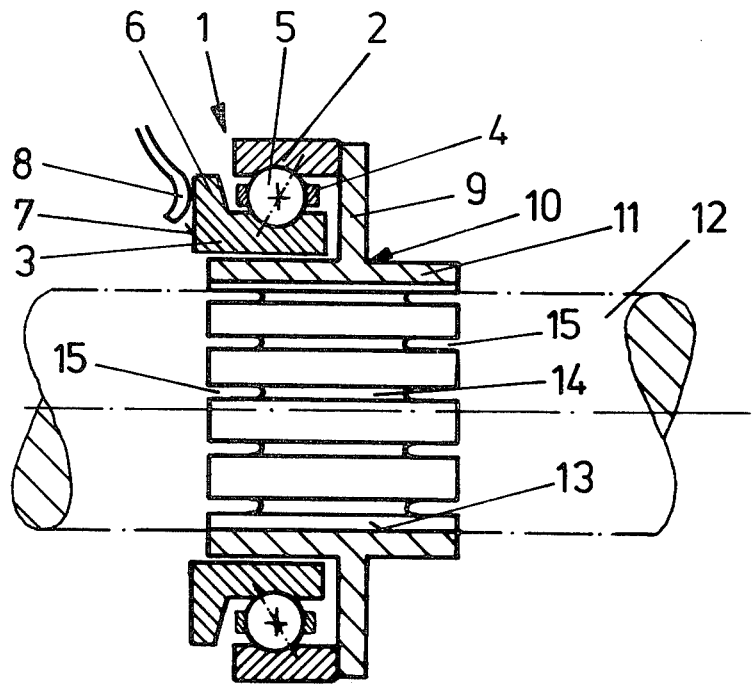

United States Patent [19]

Olschewski et al.

[11] 4,434,882
[45] Mar. 6, 1984

[54] CLUTCH RELEASE BEARING

[75] Inventors: Armin Olschewski; Lothar Walter, both of Schweinfurt; Manfred Brandenstein, Eussenheim; Leo Müller, Essleben, all of Fed. Rep. of Germany

[73] Assignee: SKF Kugellagerfabriken GmbH, Schweinfurt, Fed. Rep. of Germany

[21] Appl. No.: 280,120

[22] Filed: Jul. 2, 1981

[30] Foreign Application Priority Data

Jul. 3, 1980 [DE] Fed. Rep. of Germany ... 8017878[U]

[51] Int. Cl.³ .............................................. F16D 23/14
[52] U.S. Cl. .................................. 192/98; 192/110 B; 308/3 R
[58] Field of Search .............. 192/98, 110 B; 308/233, 308/236, 237 A

[56] References Cited

U.S. PATENT DOCUMENTS 2,840,208 6/1958 Zeidler et al. .
4,117,916 10/1978 Baker ................................ 192/110 B
4,261,625 4/1981 Renano et al. ........................ 192/98

FOREIGN PATENT DOCUMENTS 1510057 5/1978 United Kingdom .
1510058 5/1978 United Kingdom .
1510059 5/1978 United Kingdom .
1545499 5/1979 United Kingdom .
2012019 7/1979 United Kingdom .
2078898 1/1982 United Kingdom .................. 192/98

Primary Examiner—John E. Murtagh
Assistant Examiner—Richard E. Chilcot, Jr.
Attorney, Agent, or Firm—Daniel M. Rosen

[57] ABSTRACT

A clutch release bearing has a sliding sleeve of a vibration damping and noise insulating material. The sliding sleeve has a flange axially engaging a bearing outer ring, the outer ring being separated from a bearing inner ring by rolling elements. The sliding sleeve has a radially inner sliding surface with axially extending recesses, the recesses extending radially through the end faces of the sliding sleeve.

5 Claims, 2 Drawing Figures

CLUTCH RELEASE BEARING

This invention is directed to a clutch release bearing, in particular a bearing for automotive-vehicle clutches, having a sliding sleeve made of a vibration damping and noise-insulating material, which sleeve is disposed with small clearance on a guiding element, in a manner that allows axial back and forth movement.

A clutch release bearing of this type has been disclosed, for instance, in U.S. Pat. No. 2,840,208. In this known design, a sliding sleeve made of a vibration damping and noise-insulating material, such as plastic or similar material, is utilized, on which sleeve the release bearing proper is fastened, whereby the sliding sleeve is disposed with small clearance on a rigid guiding element, such as, for instance, a guide tube, in a manner that allows axial back and forth movement.

Since plastic materials have the characteristic of shrinking with time, this design, using a smooth bore of the sliding sleeve, presents the risk that the sliding sleeve will stick on the guiding element. This risk is further increased if dirt collects on the guiding element, which dirt is pressed in during the axial movement of the sliding sleeve, into the annular space between sliding sleeve and guiding element, and thus also causes seizing. Furthermore, the release bearing, upon one-sided application of force by the actuating levers, or release parts, tries to tilt or jam. The freedom of movement of the sliding sleeve is constrained, if the sliding sleeve with which the release bearing is connected, is disposed on the rigid guiding elements with a small clearance only. Particularly if the sliding sleeve is relatively long, rubbing of the parts ensues, causing wear or destruction of the sliding sleeve, or even of the clutch release bearing.

It is the object of the present invention, to produce a clutch release bearing of the above type, in which the possibility of axial shifting is ensured at all times, and which furthermore is capable of tilting within certain limits, without the occurrence of excessive wear.

This object is fulfilled by the present invention in that the sliding sleeve is provided with recesses that run axially, distributed around the circumference, and is provided at its end regions with slits that originate at the front ends.

Due to the use of the recesses that extend axially, which recesses, in accordance with further characteristics of the invention, are disposed in the bore or also in the bore and at the cylindrical surface (in the latter case, it is practical to dispose them in a manner that is shifted in relation to one another), the wall thickness of the sliding sleeve is reduced at several points about its circumference, and the plastic material is allowed, on one hand, to expand elastically in a circumferential direction, and on the other hand, to adjust to a slanted position. The slits which, in accordance with a further characteristic of the innovation, are disposed preferably in the region of these recesses, make the ends of the sliding sleeve more elastic, and thereby also permit a determined slanting of the release bearing. Both steps—i.e., both the recesses in the bore and the slits—contribute to a certain "channeling" of the dirt that deposits on the rigid guiding element, and in so doing prevent penetration into the most narrow slot between bore of the sliding sleeve and cylindrical surface of the rigid guiding element.

A few examples of embodiment of the invention are described in attached drawing.

Figure 2:
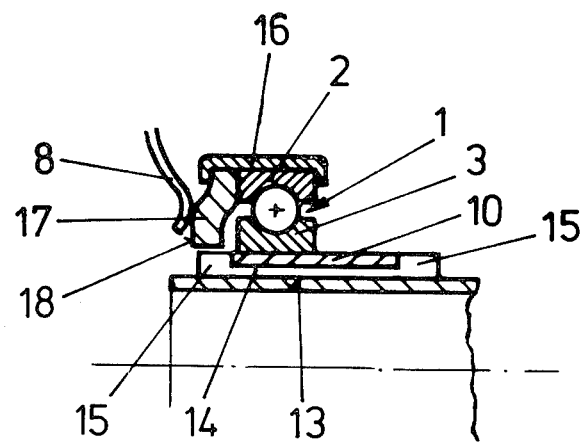

The figures show the following:

FIG. 1, a cross-section of a release bearing with rotating inner ring, the bearing being disposed on a radial flange of the sliding sleeve; and FIG. 2, a portion of a cross-section of a modified release bearing with rotating outer ring, wherein the inner ring is mounted on a substantially cylindrical sliding sleeve.

The clutch release bearing according to FIG. 1, is designated by "1", and consists of an outer ring 2, an inner ring 3, and balls 5 between the two bearing rings preferably disposed in a cage 4. The inner ring 3 has a ring shaped flange 6 on one end face directed radially outward, whose front end 7 is in an operative connection with the tongues 8 of the clutch diaphragm-spring, which tongues are only sketched in for illustration purposes. The outer ring 2 is disposed (in a manner not described in detail) at the radial flange 9 of a sliding sleeve 10, made of a vibration damping and noise-insulating material, such as plastic or similar material. The sliding sleeve 10 is supported in an axially shiftable manner, via a substantially cylindrical part 11, on the rigid guiding element 12. In the bore 13 of sliding sleeve 10 there are provided recesses 14, extending axially, distributed about its circumference, by means of which the wall thickness of sliding sleeve 10 is reduced at a number of points around its circumference, in a manner such that sliding sleeve 10, in spite of the shrinking in a circumferential direction that is common in plastics, remains elastic. In the end regions of sliding sleeve 10, there are provided axial slits 15, originating at the ends, which slits, on one hand, make the ends of sliding sleeve 10 even more elastic, and on the other hand permit a tilting of sliding sleeve 10.

In the embodiment according to FIG. 2, inner ring 3 of clutch release bearing 1 is mounted directly on the cylindrical sliding sleeve 10, while outer ring 2 is connected to a thrust ring 17, by means of a sheet-metal cap 16 that is bent radially inward at both ends, thrust ring 17 abutting with its front face 18 against the tongues 8 of the clutch diaphragm spring. Sliding sleeve 10 is provided (as in the embodiment according to FIG. 1) in bore 13, with axially extending recesses 14, that are distributed about its circumference. In the region of the ends of sliding sleeve 10, axial slits 15 that originate at the end faces are provided, which have the same effect described in FIG. 1.

We claim:

1. In a release bearing, particularly for automotive-vehicle clutches, with a sliding sleeve made of a vibration damping and noise-insulating material, the sleeve being mounted with small clearance on a guiding element, in a manner that allows axial back and forth movement; the improvement wherein the sliding sleeve is provided with recesses that extend in an axial direction and are distributed around the circumference and has slits in the regions thereof adjacent its axial ends that originate at its axial ends.

2. Release bearing according to claim 1, characterized in that the recesses (10) are located in the bore of the sliding sleeve (10).

3. Release bearing according to claim 2, characterized in that, in addition to the recesses in the bore of the sliding sleeve, said slits are also provided in the cylindrical surface of sliding sleeve.

4. Release bearing according to claim 3, characterized in that the slits in the cylindrical surface of sliding sleeve are disposed in a manner that is shifted in relation to the recesses the bore of sliding sleeve.

5. Release bearing according to claim 1, characterized in that the slits are disposed in the region of the recesses.

* * * * *

UNITED STATES PATENT AND TRADEMARK OFFICE
CERTIFICATE OF CORRECTION

PATENT NO. : 4,434,882
DATED : March 6, 1984
INVENTOR(S) : Armin Olschewski et al.

It is certified that error appears in the above-identified patent and that said Letters Patent are hereby corrected as shown below:

In col. 2, line 28, insert --front-- before "ends";
line 56, delete "(10)";
line 57, delete "(10)";
line 64, insert --in-- after "recesses".

Signed and Sealed this

Twenty-fifth Day of September 1984

[SEAL]

Attest:

GERALD J. MOSSINGHOFF

Attesting Officer

Commissioner of Patents and Trademarks